Sept. 16, 1969   R. J. CHANDLER   3,467,410

WELDED JOINT FOR LINED PIPE

Filed May 19, 1967

INVENTOR

RAY J. CHANDLER

Emil J. Bednar

ATTORNEY 3,467,410
WELDED JOINT FOR LINED PIPE
Ray J. Chandler, Dallas, Tex., assignor to Mobil Oil
Corporation, a corporation of New York
Filed May 19, 1967, Ser. No. 639,856
Int. Cl. F16l 13/02, 15/00, 25/00
U.S. Cl. 285—55                                 1 Claim

ABSTRACT OF THE DISCLOSURE

This specification discloses:

The joining of lengths of corrodible metal pipe which carries an internal, nonmetallic, corrosion-resistant lining. For this purpose, tubular sections of a corrosion-resistant metal are secured axially to the ends of the metal pipe. The tubular sections may be secured to the metal pipe by welding. Then, the internal lining is placed within the metal pipe to extend within the tubular sections toward their outer ends. The lining may be formed of cement. Each tubular section has an axial dimension greater than the longitudinal distance from its outer end in which the nonmetallic, corrosion-resistant lining undergoes thermal and mechanical injury during subsequent welding together of the outer ends of abutting tubular sections. Thereafter, the lengths of lined pipe are positioned with the outer ends of the tubular sections in abutment. The abutted tubular sections are then secured together in fluidtight relationship with a connecting weld of corrosion-resistant metal compatible with the metal of the tubular sections. The tubular sections, and the connecting weld therebetween, can be formed from stainless steel.

BACKGROUND OF THE INVENTION

Field of the invention

This invention relates to pipe joints for interconnecting lined metal pipe. More particularly, it relates to a welded joint, of corrosion-resistant metal, employed with a corrodible metal pipe which contains an internal protective lining of a noncorrodible, nonmetallic material.

Description of the prior art

When a corrodible metal pipe, usually of steel, is used to carry corrosive fluids, severe corrosion and ultimate destruction of the usefulness of such pipe occur. For example, the fluid produced from some oil and gas wells are highly corrosive to steel. Similarly, certain oil field waters containing salts and hydrogen sulfide are so corrosive that it is impracticable to employ steel pipe for carrying them. In these situations, it is common to employ a protective lining within the steel pipe to prevent these corrosive fluids from attacking the metal pipe. Various types of materials, such as cement, ceramics or plastics, have been employed for lining steel pipe. Whatever lining is used, there is a problem of sealing the linings between the lengths of metal pipe at the interconnecting joint to prevent the corrosion of the metal pipe. For example, gaskets in the form of annular rubber or plastic bodies, and adhesive materials, have been compressed between the linings of adjacent pipe at the joint. However, assembly is difficult of a joint with such gaskets. Usually, these gaskets leak after a short period of use. As a result, the corrosive fluids leak past the gasket at the joint to attack the metal pipe behind the lining.

Various methods and structures for joining lined pipe have been proposed to avoid the above-mentioned problems. However, these proposals have not accomplished the desired result because of the complex or expensive nature of construction involved, or for other reasons.

It would be most desirable to interconnect lengths of lined metal pipe by welding. In FIGURE 1 of the drawings, there is shown, in longitudinal section, a cement-lined, steel pipe which is joined directly by a weld. Before welding, steel pipes 11 and 12 are internally provided with cement linings 13 and 14, respectively. A gasket 15 is placed between the linings 13 and 14. The pipes 11 and 12 are then joined by weld 16. The very high temperatures generated in forming the weld 16 cause adjacent portions of the cement linings 13 and 14 to undergo thermal and mechanical injury, such as fracturing, chipping, and cracking. Such injury to the cement linings occurs at the weld 16 and therefrom for some distance longitudinally along the pipes 11 and 12. This distance is indicated generally by the brackets designated with the letter S. As a result, corrosive fluids penetrate, at the injured portions, the linings 13 and 14 to attack the metal pipes 11 and 12 at the areas 17, 18, and 19. Eventually, the metal pipes 11 and 12 are perforated through such corrosion and begin to leak. This condition eventually requires either replacement, or repair, of the pipes 11 and 12 adjacent the weld 16.

The joining of lined-metal pipe, by welding, is of great advantage. Welding permits a rapid and economic interconnection of metal pipe, and it can be carried out readily in the field. It is the purpose of this invention to provide for the joining, by welding, of lengths of corrodible metal pipe which carries internally a nonmetallic, corrodible metal pipe which carries internally a nonmetallic, corrosion-resistant lining without the problems associated with the practice discussed relative to FIGURE 1.

SUMMARY OF THE INVENTION

In accordance with this invention, there is provided (a) a method for joining, by welding, of lengths of corrodible metal pipe which carries internally a nonmetallic, corrosion-resistant lining; (b) a joint produced by such method; and (c) a new article of manufacture employed in the assembly of such joint. In one aspect, tubular sections of a corrosion-resistant metal are secured axially to the ends of the metal pipe to form a joint of pipe. The tubular sections and metal pipe have substantially the same sidewall thickness and internal diameter where secured together. An internal lining is placed in each length of the metal pipe to extend within the tubular sections carried thereon towards their outer ends. The lining is nonmetallic and corrosion resistant, but is subject to thermal and mechanical injury by temperatures generated from welding together of the outer ends of abutting tubular sections. Each tubular section has an axial dimension greater than the longitudinal distance from its outer end in which the lining undergoes thermal and mechanical injury during welding together of outer ends of abutting tubular sections. With the lined metal pipe positioned with the outer ends of the tubular sections thereon in abutment, a connecting weld secures the abutted tubular sections of adjacent lined-metal pipe together in fluid-tight relationship. The connecting weld is of a corrosion-resistant metal compatible with the metal of the tubular sections. As a result, corrosive fluids which may penetrate the lining, at the location of any injury caused by welding of the tubular sections together, can encounter only the corrosion-resistant section behind the lining and not the metal pipe.

DESCRIPTION OF SPECIFIC EMBODIMENTS

Figure 2:
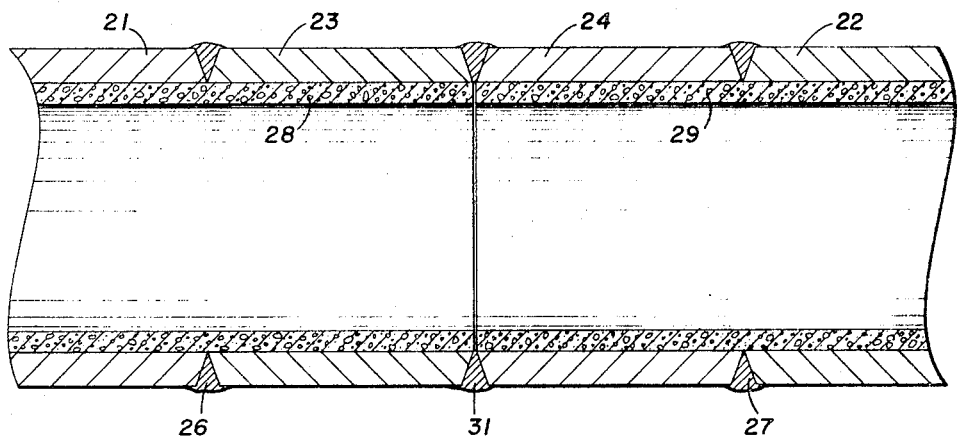
FIGURE 2 is a longitudinal section through cement-lined metal pipe joined by welding in accordance with the present invention.

Referring to FIGURE 2, there is shown lengths of corrodible metal pipes 21 and 22 which are to be joined, by welding, in accordance with this invention. Usually, the pipes 21 and 22 will be steel or other ferrous metals. Tubular section 23 is secured axially to the pipe 21; and tubular section 24 is secured axially to the pipe 22. The tubular sections may be secured to the metal pipes by welds 26 and 27. However, other means for securing the tubular sections to the metal pipes may be used. Preferably, the tubular sections 23 and 24, and the metal pipes 21 and 22, have substantially the same sidewall thickness and internal diameter at their portions secured together by welds 26 and 27. The sidewall thicknesses and internal diameters of the tubular sections 23 and 24, and the metal pipes 21 and 22, may be considered substantially the same, where they are secured together, as long as any variance therebetween does not interfere with the accomplishing the stated results of the present invention.

Each of the tubular sections 23 and 24 has an axial dimension greater than the longitudinal distance from its outer end in which an internally carried, nonmetallic, corrosion-resistant lining will undergo thermal and mechanical injury during welding together of the outer ends of the abutting tubular sections. For example, with momentary reference to FIGURE 1, this axial dimension will be greater than the dimension indicated by the bracket S for metal pipe and lining of like character. The dimension S has been observed to be about one-half inch when good welding practices are used. However, the dimension S may be greater. No specific criterion can be given as to the axial dimension of the tubular sections 23 and 24. However, for any given metal pipe, and lining, the axial dimension can be determined by welding together the metal pipe, and then, inspecting the injured portion of the lining.

The tubular sections 23 and 24 can be of any corrosion-resistant metal which can be joined by welding, without a significant change in the corrosion-resistant properties of the tubular sections and the weld. For example, the tubular sections 23 and 24 may be of stainless steel. The 304 and 316 type stainless steels have proven satisfactory. These stainless steels may be readily joined together by welding with a stainless steel type welding rod. Monel metal has also been used with good results.

After the tubular sections 23 and 24 are secured to the metal pipes 21 and 22, respectively, an internal lining is placed in each length of the metal pipe to extend within the tubular sections towards their outer ends. Any nonmetallic, corrosion-resistant lining may be used. Preferably, the lining is cement. For example, cement is applied to the inner surface of the metal pipes 21 and 22, and to the tubular sections 23 and 24, by placing an amount of properly formulated cement mix within each length of pipe. Then, the pipe containing the cement is spun about its longitudinal axes until the cement spreads throughout the metal pipe and tubular sections to provide substantially uniform linings of desired thickness. By this means, linings 28 and 29, of cement, are placed into the assembled metal pipes and tubular sections. After the linings 28 and 29 are in place, the metal pipes 21 and 22 with the tubular sections 23 and 24 are an article of manufacture which can be fabricated within a factory and then taken into the field to be interconnected into a pipeline by welding.

It is not essential that the linings 28 and 29 extend to the ends of the tubular sections 23 and 24. If desired, the linings 28 and 29 may terminate along the inner surface of the tubular sections 23 and 24 after having covered the welds 26 and 27. Stated in another manner, the linings 28 and 29 need only extend within the tubular sections 23 and 24 toward their outer ends a sufficient distance to prevent corrosive fluids from encountering the welds 26 and 27 and metal pipes 21 and 22.

The lined metal pipes 21 and 22 are now positioned with the outer ends of the tubular sections 23 and 24 in abutment. Preferably, the pipes are in axial alignment but, if desired, they may also be joined in slight misalignment. The abutted tubular sections 23 and 24 are now secured together in fluid tight relationship with a connecting weld of a corrosion-resistant metal compatible with the metal of the tubular sections. For example, where the tubular sections 23 and 24 are of stainless steel, the connecting weld 31 will be provided by welding them together with a stainless steel type welding rod. For other corrosion-resistant metals, compatible welds are similarly employed.

When the tubular sections 23 and 24 are welded together, the portions of the linings 28 and 29 which are injured in welding are adjacent only the corrosion-resistant tubular sections. Thus, the only metal portions of the assembled pipe joint later exposed to a corrosion environment are the tubular sections 23 and 24, and the weld 31. Additionally, there is no need for a seal between the linings, such as the gasket 15 shown in FIGURE 1.

The present invention has been successfully tested in the field. Several lengths of 4.5 inch OD steel pipe were provided. Tubular sections, of the required axial dimension, were formed of 304 and 316 stainless steel, and Monel metal, and welded to the ends of the pipe. The pipe was then cement lined in a conventional manner. These sections, in like pairs, were then joined together in abutment by electrical welding, with compatible welds. The pipe was placed into field use in a waterflood operation in Texas to carry a water most aptly described as a low pH-sour brine. The water was very corrosive to steel. The joints remained in service for almost a year with no sign of corrosion damage occurring to the steel pipe adjacent the welds. Under the same circumstances, directly joining lengths of cement-lined steel pipe, as shown in FIGURE 1, results in a failure at the weld in the joint within a very short period of time which may be, for example, less than one month's service.

Figure 1:
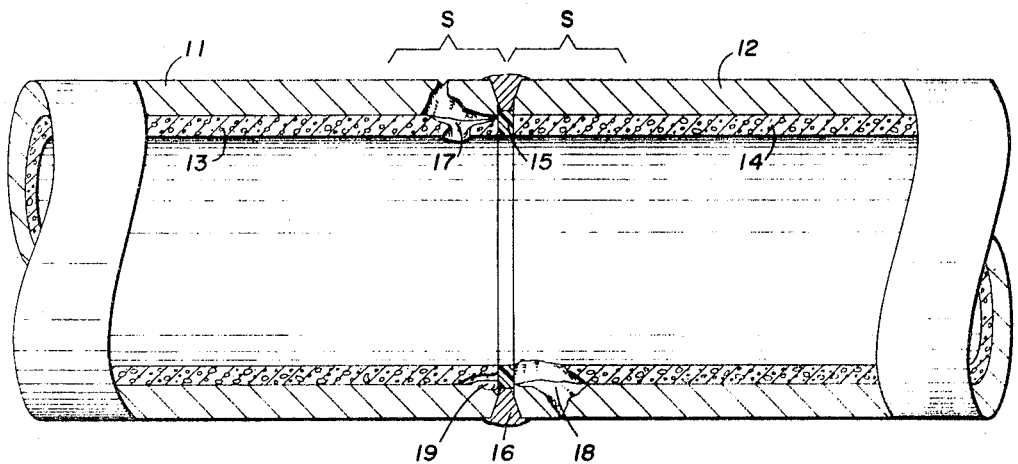
FIGURE 1, as earlier mentioned, is a longitudinal section through cement-lined metal pipe directly interconnected by welding without the benefit of the present invention.

From the foregoing it will be apparent that there has been provided by this invention the joining of lined metal pipes, by welding in a manner to overcome the problems encountered by the practice, described in reference to FIGURE 1. Various changes and adaptations may be made to the present invention, without departing from its intent, by a person skilled in the art. It is intended that the foregoing description be considered as illustrative and descriptive of the present invention.

What is claimed is:

1. A pipeline formed of joints of cement-lined pipe butt-welded together, comprising:
   (a) a plurality of joints of cement-lined pipe, each of said joints being comprised of;
      (1) corrodible metal pipe and two tubular sections of corrosion-resistant metal having essentially the same cross-sectional dimensions as said corrodible metal pipe axially aligned with said pipe, one of said tubular sections being attached by a butt weld to one end of said corrodible metal pipe and another of said tubular sections being attached by a second butt weld to an opposite end of said corrodible metal pipe, and
      (2) an internal cement lining covering the internal surface of said corrodible metal pipe and extending within said tubular sections to form a joint of pipe; and (b) butt welds of corrosion-resistant metal compatible with said corrosion-resistant metal of said tubular sections joining successive axially aligned joints of pipe to form a pipeline.

References Cited

UNITED STATES PATENTS

| | | | |
|---|---|---|---|
| 1,951,221 | 3/1934 | Tate | 25—38 |
| 2,361,636 | 10/1944 | Koppel | 285—55 |
| 2,374,763 | 5/1945 | Martin | 285—55 |
| 2,396,704 | 3/1946 | Kerr | 285—173 |
| 3,202,562 | 8/1965 | Lang | 285—21 X |
| 3,325,191 | 6/1967 | Yates | 285—55 |
| 3,336,054 | 8/1967 | Blount et al. | 285—55 |

FOREIGN PATENTS 1,199,181   6/1959   France.

MARION PARSONS, Jr., Primary Examiner

WAYNE L. SHEDD, Assistant Examiner

U.S. Cl. X.R.

29—157; 285—286